United States Patent
Elgowainy et al.

(10) Patent No.: US 11,506,342 B1
(45) Date of Patent: Nov. 22, 2022

(54) PRECOOLING SYSTEM UTILIZING CRYOGENIC LIQUID FUELS FOR FUELING PRESSURIZED VEHICLE GASEOUS ONBOARD STORAGE TANK SYSTEM WITH CONTROLLED DISPENSING TEMPERATURES

(71) Applicant: UChicago Argonne, LLC, Chicago, IL (US)

(72) Inventors: Amgad A. Elgowainy, Lisle, IL (US); Krishna R. Reddi, Bolingbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 17/325,819

(22) Filed: May 20, 2021

(51) Int. Cl.
F17C 7/04 (2006.01)

(52) U.S. Cl.
CPC .......... *F17C 7/04* (2013.01); *F17C 2221/012* (2013.01); *F17C 2221/033* (2013.01); *F17C 2223/0161* (2013.01); *F17C 2225/0123* (2013.01); *F17C 2227/0135* (2013.01); *F17C 2227/0323* (2013.01); *F17C 2227/0355* (2013.01); *F17C 2250/032* (2013.01); *F17C 2250/0636* (2013.01); *F17C 2265/065* (2013.01)

(58) Field of Classification Search
CPC ................................ F28D 7/082; Y02E 60/32
USPC .................................................. 165/274, 276
See application file for complete search history.

(56) References Cited

U.S. PATENT DOCUMENTS

| | | | | |
|---|---|---|---|---|
| 5,944,089 A | * | 8/1999 | Roland | F28D 20/021 165/10 |
| 2019/0137041 A1 | * | 5/2019 | Reese | F17C 13/04 |
| 2019/0368426 A1 | * | 12/2019 | Kanei | F01D 15/10 |
| 2020/0095113 A1 | * | 3/2020 | Crispel | F17C 5/06 |

FOREIGN PATENT DOCUMENTS

| | | |
|---|---|---|
| CN | 109708000 B | 8/2020 |
| WO | WO2018173136 A1 | 9/2018 |

OTHER PUBLICATIONS

Linde AG, "Air-Heated Vaporisers", 2021 www.linde.de.
Linde AG, "Linde Hydrogen FuelTech Tomorrow's fuel today", 2021 www.linde-engineering.com.
Linde AG, "Coil-wound heat exchangers, Individually designed to customer needs", 2021 www.linde-engineering.com.

* cited by examiner

*Primary Examiner* — Timothy P. Kelly
*Assistant Examiner* — Christopher M Afful
(74) *Attorney, Agent, or Firm* — Joan Pennington

(57) ABSTRACT

A method and a precooling system are provided for precooling gaseous fuel supplied for fueling pressurized gaseous vehicle onboard storage tank systems. The precooling system is used in pressurized gaseous fueling stations with source fuels in cryogenic state, such as liquid hydrogen (LH2) and liquefied nature gas (LNG). A thermal buffer heat exchanger includes a heat exchanger medium, and a cold loop and a warm loop contained in the heat exchanger medium. A control unit is configured for controlling cryogenic fuel supplied to the cold loop for cooling the thermal buffer heat exchanger. The thermal buffer heat exchanger enables precooling high pressure gaseous fuel to a preset temperature supplied to a dispenser supplying high pressure gaseous fuel to refuel a vehicle onboard storage tank system.

13 Claims, 6 Drawing Sheets

PRECOOLING SYSTEM UTILIZING CRYOGENIC LIQUID FUELS FOR FUELING PRESSURIZED VEHICLE GASEOUS ONBOARD STORAGE TANK SYSTEM WITH CONTROLLED DISPENSING TEMPERATURES

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE INVENTION

The present invention relates generally to a precooling system for precooling gaseous fuels in gaseous fueling stations, and more particularly, relates to a method and a precooling system for precooling gaseous fuels used for fueling vehicle onboard storage tank systems in gaseous fueling stations with source fuels in cryogenic state, such as liquid hydrogen (LH2) and liquefied nature gas (LNG).

DESCRIPTION OF THE RELATED ART

As used in the following description and claims, the term gaseous fuels should be broadly understood to include various currently available gaseous fuels, such as including hydrogen and compressed natural gas (CNG) and various other gaseous fuels that may be available in the future, and the term source cryogenic liquid fuels should be broadly understood to include various currently available fuels supplied at cryogenic state, such as liquid hydrogen (LH2) and liquefied nature gas (LNG) and various other fuels supplied at cryogenic state that may be available in the future. As used in the following description and claims, example liquid hydrogen (LH2) and hydrogen fueling stations are described for an understanding the invention, while this should be understood that the present invention is not limited to hydrogen. The present invention advantageously is used with various fuels supplied at cryogenic state to gaseous fuels stations for dispensing gaseous fuels into vehicle onboard storage tank systems.

Gaseous fuels are liquefied by cooling to cryogenic temperatures through a liquefaction process. Gaseous hydrogen is liquefied, for example, by cooling below −253° C. (−423° F.). Once hydrogen is liquefied it can be stored at the gaseous fueling stations in large thermally insulated cryogenic tanks. The liquid hydrogen (LH2) is vaporized to a high-pressure gaseous fuel and stored in high pressure buffer storage for dispensing into vehicle onboard storage tank systems. The high-pressure gaseous fuel must be precooled to a required preset temperature before dispensing into a vehicle onboard storage tank system.

FIG. 4 illustrates a typical vehicle fueling station with a liquid hydrogen (LH2) source including an onsite cryogenic tank 1, which is replenished through liquid hydrogen delivery by cryogenic tankers. The liquid hydrogen from the cryogenic storage tank 1 is pressurized by a cryogenic pump 2 and gasified by an evaporator 4. The high-pressure gaseous hydrogen from the evaporator 4 is stored in the high-pressure buffer storage system 6. The high-pressure hydrogen from the high-pressure storage 6 is precooled to the required preset temperature by a cooling unit, including a heat exchanger (HX) 7 and a refrigeration or chiller system 8 to cool the gaseous fuel before supplying gaseous hydrogen to a dispenser 9 dispensing into the vehicle onboard storage tanks system 10.

Precooling is required, for example, to −20° C. or −40° C. at hydrogen fueling stations for fast fueling of gaseous tanks onboard fuel cell vehicles. Known precooling systems are generally expensive including precooling system equipment capital, operational and maintenance costs. Typically, the precooling refrigeration or chiller system is a major part of operational and maintenance costs for gaseous fueling stations.

It is desirable to provide an enhanced method and an enhanced precooling system for high-pressure gaseous fueling stations with source fuels in cryogenic state, such as liquid hydrogen (LH2) and liquefied nature gas (LNG).

It is desirable to provide such enhanced method and enhanced precooling system for gaseous fueling stations with source fuels in cryogenic state that effectively and efficiently provides precooling during station operation.

It is desirable to provide such enhanced method and enhanced precooling system for high-pressure gaseous fueling stations with source fuels in cryogenic state that minimizes precooling costs and electricity usage costs.

It is desirable to provide such enhanced method and enhanced precooling system for high-pressure gaseous fueling stations with source fuels in cryogenic state that includes an overall simple configuration and additionally that simplifies controls.

It is desirable to provide such enhanced method and enhanced precooling system for high-pressure gaseous fueling stations with source fuels in cryogenic state that enables enhanced pressurized gaseous station fueling operation over known arrangements.

SUMMARY OF THE INVENTION

Principal aspects of the present invention are to provide an enhanced method and an enhanced precooling system for high-pressure gaseous fueling stations with source fuels in cryogenic state to reduce overall precooling costs while effectively and efficiently enabling pressurized gaseous station operation. Other important aspects of the present invention are to provide such method and precooling system without substantial negative effect and that overcome some of the disadvantages of prior art arrangements.

In brief, an enhanced method and an enhanced precooling system are provided for use in pressurized gaseous fueling stations with source fuels in cryogenic state, such as liquid hydrogen (LH2) and liquefied nature gas (LNG). The gaseous fueling station includes a cryogenic tank storing liquefied cryogenic source fuel, an evaporator coupled to the cryogenic tank via a cryogenic pump receiving liquefied cryogenic fuel supplied to a high-pressure buffer storage storing high-pressure gaseous fuel, and a dispenser supplying high pressure gaseous fuel to refuel a vehicle onboard storage tank system. The precooling system includes a thermal buffer heat exchanger including a heat exchanger medium, and a cold loop and a warm loop contained within the heat exchanger medium. A control unit is configured for controlling cryogenic liquid fuel supplied to the cold loop for cooling of the thermal buffer heat exchanger medium. The control unit is configured for controlling the thermal buffer heat exchanger to enable precooling high pressure gaseous fuel to a preset temperature supplied to the dispenser, supplying the high-pressure gaseous fuel to a vehicle onboard storage tank system.

The thermal buffer heat exchanger system receives cryogenic liquid fuel through the cold loop with a selected mass flow rate based on the temperature of the thermal buffer heat exchanger medium. The warm loop receives gaseous fuel to be cooled for providing gaseous fuel to a dispenser at the predefined temperature, for example, −20° C. or −40° C. at hydrogen fueling stations.

In accordance with features of the invention, a flow control device is coupled to the control unit for controlling flow of pressurized gaseous fuel from the high-pressure buffer storage and from the evaporator to the thermal buffer heat exchanger, to an optional flow mixing device, and to the dispenser, responsive to operational modes of the gaseous fueling station.

In accordance with features of the invention, the thermal buffer heat exchanger is configured for precooling high-pressure gaseous fuel to a preset temperature supplied to the dispenser. The warm loop is configured for precooling high-pressure gaseous fuel from the high-pressure buffer storage and from the evaporator responsive to operational modes of the gaseous fueling station.

In accordance with features of the invention, the warm loop is selectively circuited inside the thermal buffer heat exchanger enabling multiple path lengths and flow rates of gaseous fuel in each circuit to control exit gaseous fuel temperature to match a predefined dispensing temperature. The warm loop is selectively circuited inside the thermal buffer heat exchanger, for example using a set of coordinated and controlled valves.

In accordance with features of the invention, the cold loop is selectively circuited inside the thermal buffer heat exchanger enabling multiple path lengths and flow rates of liquid fuel flow in each circuit to control the temperature of the thermal buffer heat exchanger medium. The cold loop is selectively circuited responsive to cooling demand resulting from a predetermined idle dispenser period and from simultaneous vehicle fills at multiple dispensing positions.

In accordance with features of the invention, the precooling system of the gaseous fueling station enables effectively and efficiently serving multiple vehicles simultaneously, while the thermal buffer heat exchanger medium can be cooled during fueling operation, and during idle dispenser periods between vehicle fueling.

In accordance with features of the invention, a flow control device is coupled to the control unit for controlling flow from the cryogenic pump to the cold loop of the thermal buffer heat exchanger responsive to an operational mode of the gaseous fueling station.

In accordance with features of the invention, the flow control device is coupled to the control unit for controlling flow from the cryogenic pump to the evaporator responsive to an operational mode of the gaseous fueling station.

In accordance with features of the invention, a modulating drive control is coupled to the cryogenic pump to control the mass flow rate of cryogenic liquid fuel through the cryogenic pump.

In accordance with features of the invention, the heat exchanger medium includes a selected solid material having a high specific heat capacity.

In accordance with features of the invention, the heat exchanger medium includes a selected liquid coolant material having a high specific heat capacity, and the liquid coolant material can be stirred to ensure substantially uniform temperature distribution throughout the thermal buffer heat exchanger medium.

In accordance with features of the invention, one high-pressure buffer fueling path is provided from the high-pressure buffer storage into the vehicle onboard storage tank system gaseous fuel through the dispenser.

In accordance with features of the invention, hydrogen exiting the cold loop optionally is sent to an optional heat exchanger and is coupled to the high-pressure buffer storage via the control unit. Hydrogen exiting the cold loop optionally is coupled via the control unit to a flow control device. The flow control device is coupled to the warm loop of the thermal buffer heat exchanger, to an optional flow mixing device, and to the dispenser.

In accordance with features of the invention, one direct fueling path provides gaseous fuel to the vehicle onboard storage tank system through the dispenser without going through the high-pressure buffer storage.

In accordance with features of the invention, the high-pressure buffer fueling operation and the direct fueling operation can be provided simultaneously, in parallel, jointly feeding the same dispenser, or can operate in sequence, or individually exclusive of one another.

In accordance with features of the invention, one direct fueling path provides gaseous fuel to the vehicle onboard storage tank system through the dispenser without going through the warm loop of the thermal buffer and the optional flow mixing device.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized, and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

An enhanced method and precooling system are provided for precooling gaseous fuel supplied for fueling gaseous vehicle onboard storage tank systems. The precooling system is used in gaseous fueling stations with source fuels in cryogenic state, such as liquid hydrogen (LH2) and liquefied nature gas (LNG). A thermal buffer heat exchanger includes a heat exchanger medium, and a cold loop and a warm loop contained in the heat exchanger medium. A control unit is configured for controlling cryogenic liquid fuel supplied to the cold loop for cooling the thermal buffer heat exchanger. The thermal buffer heat exchanger enables precooling high pressure gaseous fuel to a preset temperature supplied to a dispenser supplying high pressure gaseous fuel to refuel a vehicle onboard storage tank system.

Figure 1A:
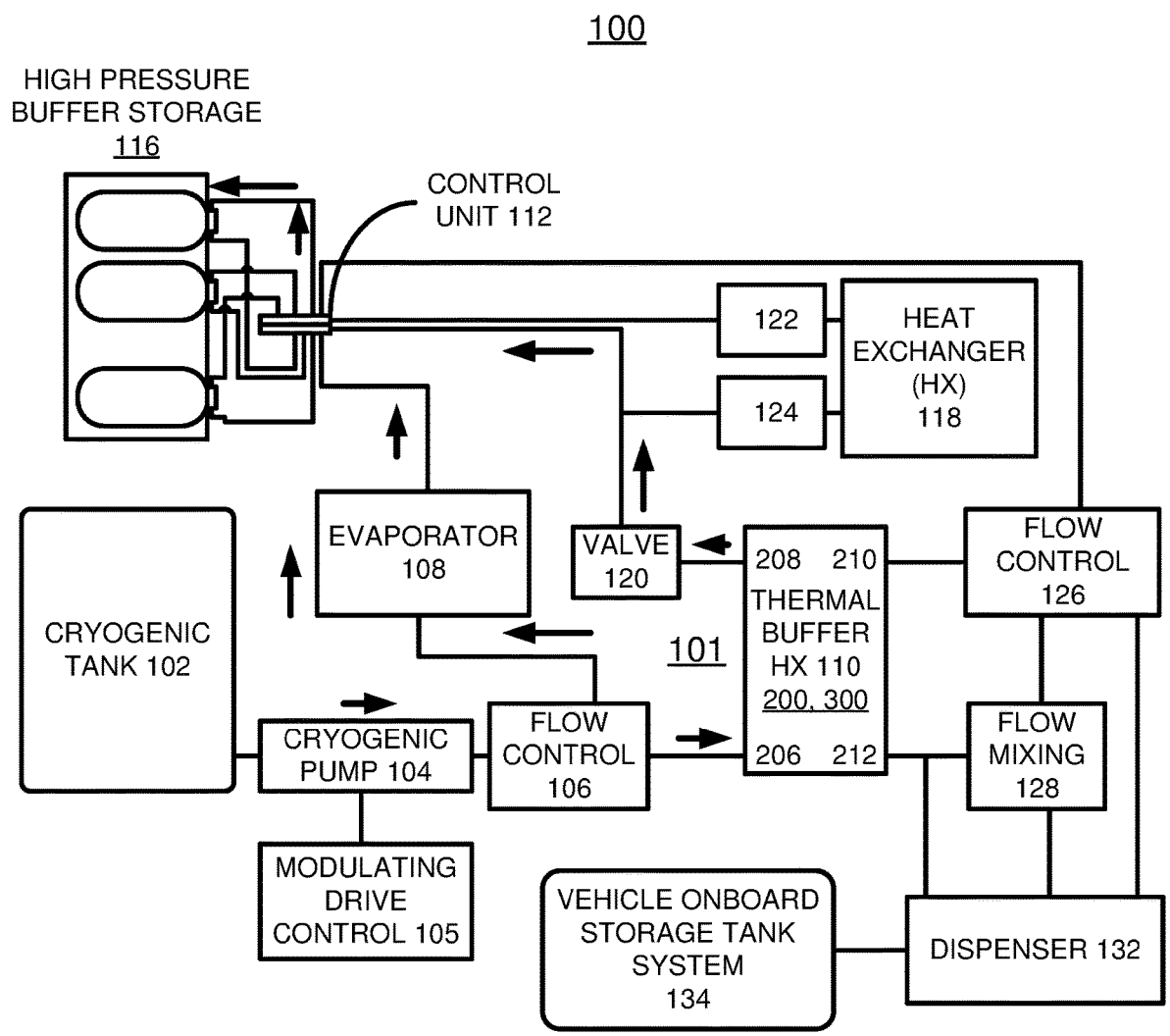
FIGS. 1A, 1B, and 1C schematically illustrate not to scale an example gaseous fueling station with cryogenic liquid source fuel with a precooling system for implementing methods for precooling in accordance with a preferred embodiment.
Figure 1B:
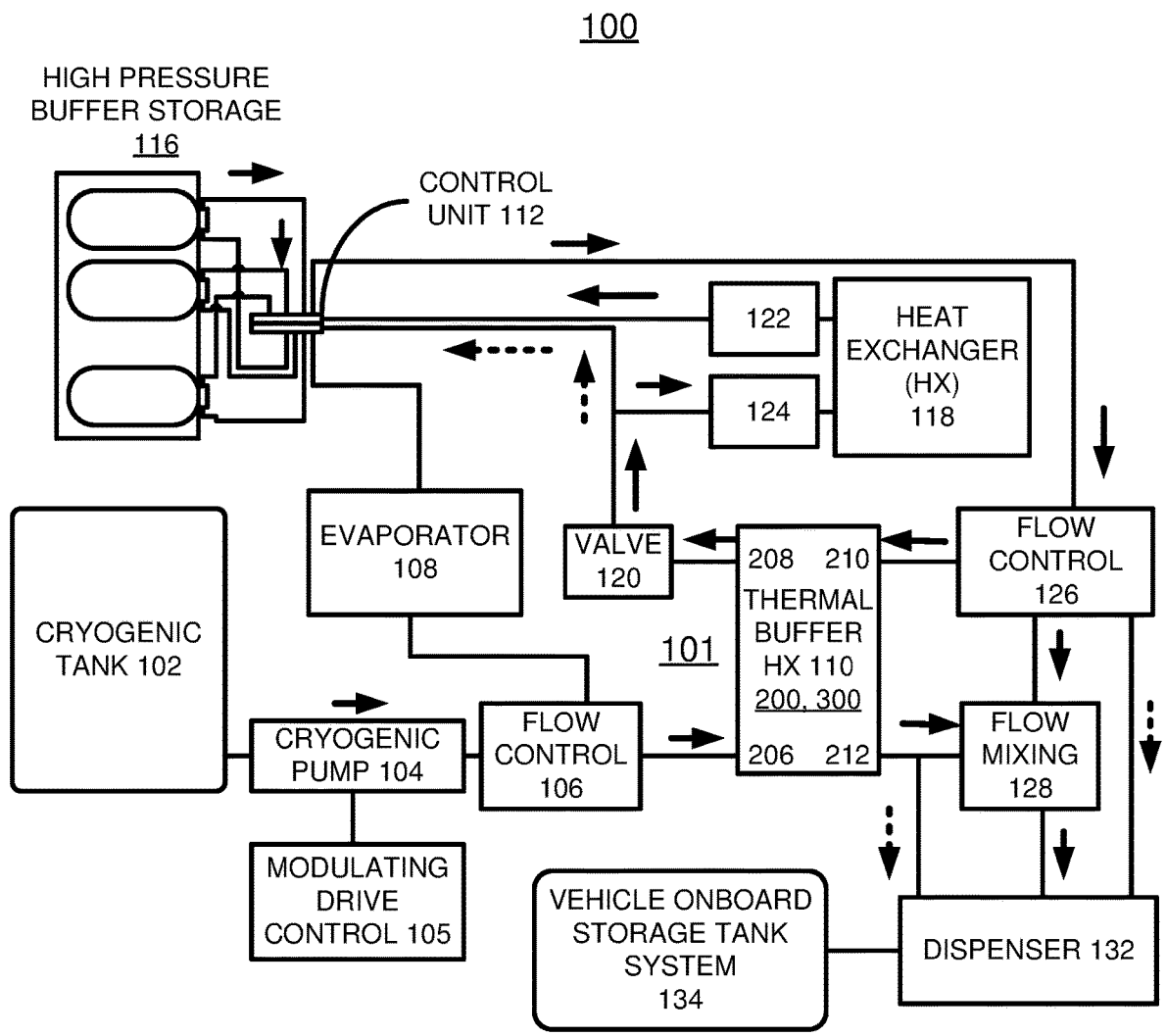
Figure 1C:
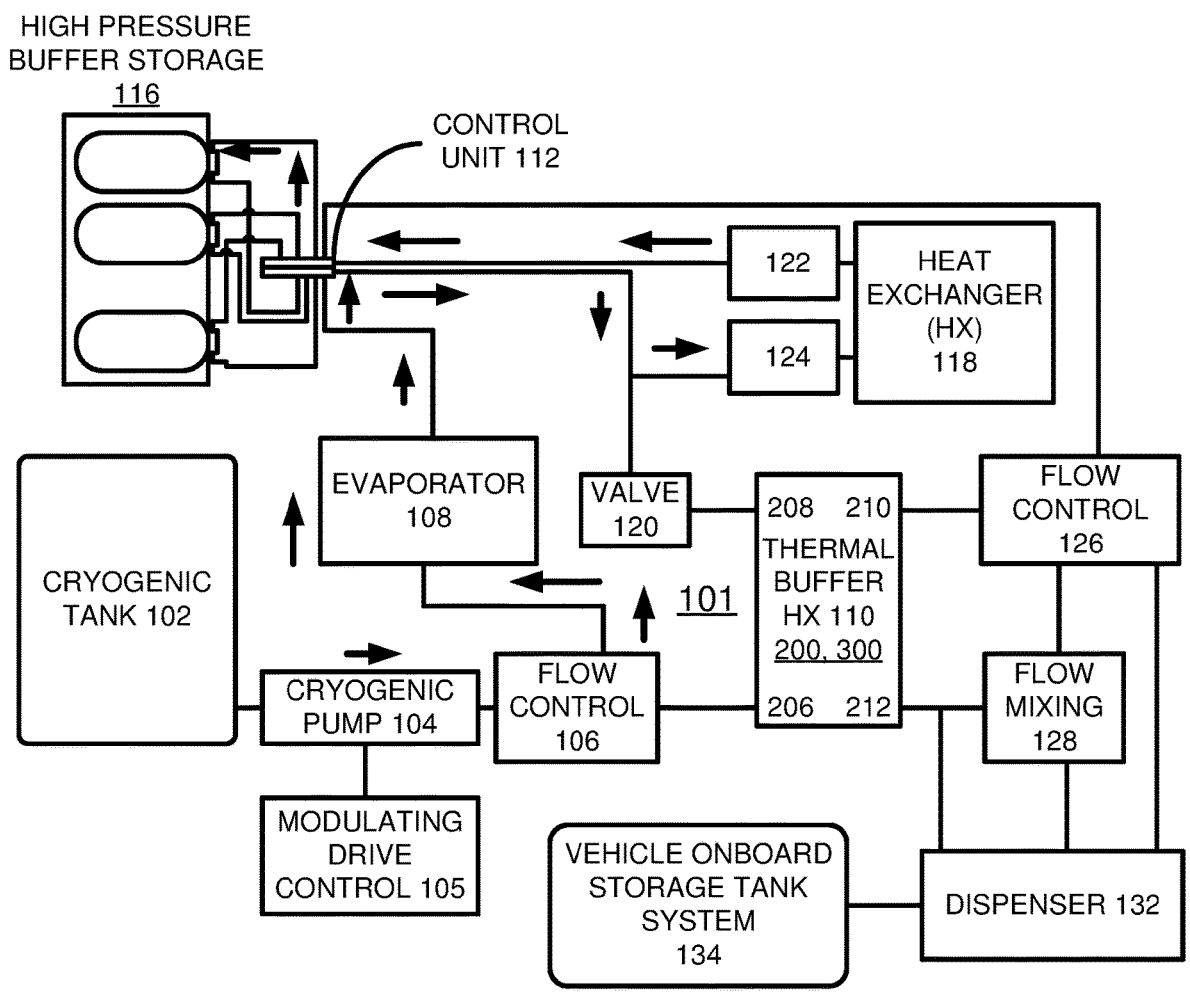

Having reference now to the drawings, in FIGS. 1A, 1B, and 1C, there is schematically shown an example gaseous fueling station generally designated by the reference character 100. The gaseous fueling station 100 includes a novel precooling system generally designated by the reference character 101 for implementing enhanced precooling methods in accordance with a preferred embodiment.

The novel precooling system 101 of the invention avoids the need for a conventional chiller or refrigeration system typically used when dispensing gaseous fuel. The novel precooling system 101 of the invention utilizes the cooling capacity of cryogenic liquid hydrogen to precool the hydrogen to a controlled predefined temperature before dispensing to a vehicle onboard storage tank system.

The precooling system 101 is integrated in the hydrogen fueling station 100 that includes a typical cryogenic liquid fuel storage tank 102 storing cryogenic source fuel, and a cryogenic pump 104. An optional modulating drive control 105 is provided with the cryogenic pump 104 to control mass flow rate of cryogenic liquid fuel through the cryogenic pump 104. The mass flow rate of cryogenic liquid fuel through the cryogenic pump 104 also can be fixed. The cryogenic pump 104 couples cryogenic liquid fuel storage to an evaporator 108 and couples cryogenic liquid fuel storage to a thermal buffer heat exchanger 110 with controlled temperature in accordance with a preferred embodiment.

The cryogenic liquefied fuel storage tank 102, the cryogenic pump 104, evaporator 108 and thermal buffer heat exchanger 110 can be implemented by selectively modifying commercially available components of the type manufactured and sold by Linde AG, of Tacherting, Germany having an internet address of www.linde.de.

The precooling system 101 includes a control unit 112 in accordance with a preferred embodiment. A flow control device 106 is controlled by the control unit 112 to selectively send liquefied cryogenic source fuel from the cryogenic pump 104 to the evaporator 108 and to the thermal buffer heat exchanger 110. The evaporator 108 supplies a high-pressure buffer storage 116 for storing high pressure gaseous fuel. The precooling system 101 optionally includes a heat exchanger 118, a one-directional valve 120 coupled to the thermal buffer heat exchanger 110, and a pair of heat exchanger control or bypass valves 122, 124. The precooling system 101 includes a flow control device 126 selectively coupling high-pressure gaseous fuel flow from the control unit 112 optionally to the dispenser 134, to the thermal buffer heat exchanger 110 and to the optional flow mixing device 128. The control unit 112 controls operation of the thermal buffer heat exchanger 110 for precooling high pressure gaseous fuel to a preset temperature coupled to the dispenser 132 for supplying the high-pressure gaseous fuel to a vehicle onboard storage tank system 134. Precooling system 101 provides precooled high-pressure gaseous fuel at the preset temperature, for example, to −20° C. or −40° C., at hydrogen fueling station 100 for fast fueling of gaseous tanks onboard fuel cell vehicles.

The control unit 112 allows gaseous fuel flow to be received from one or more of the following sources: high-pressure buffer storage 116, evaporator 108, a cold loop exit 208 of thermal buffer heat exchanger 110, and the heat exchanger 118. The control unit 112 sends gaseous fuel flow to the high-pressure buffer storage 116, and the flow control device 126. The flow control device 126 always receives gaseous fuel flow from the control unit 112. The flow control device 126 selectively allows flow to the dispenser 132 for directly supplying high-pressure gaseous fuel to a vehicle onboard storage tank system 134, to the warm loop input 210 of the thermal buffer heat exchanger 110, and/or to optional flow mixing device 128. The optional flow mixing device 128 allows optional mixing of gaseous fuel flow from a warm loop exit 212 of thermal buffer heat exchanger 110 with gaseous fuel flow from the flow control device 126. The optional heat exchanger 118 allows gaseous fuel flow from the cold loop exit 208 of thermal buffer heat exchanger 110 or from the evaporator 108.

Figure 2:
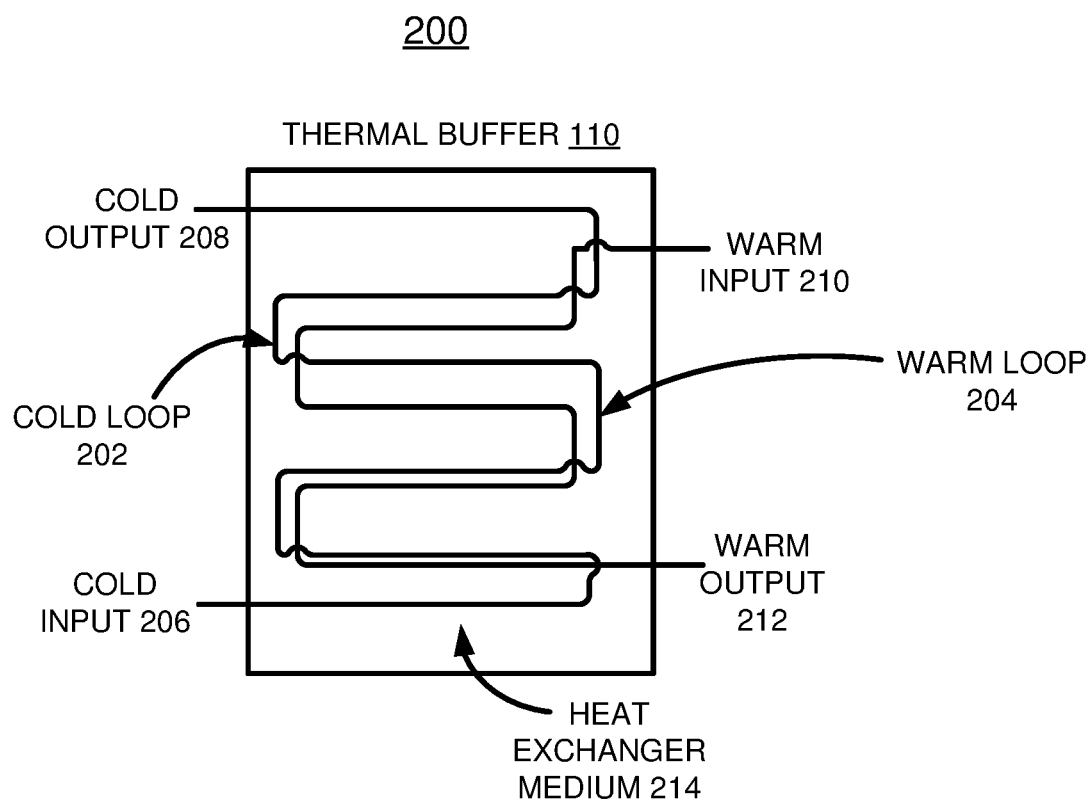
FIGS. 2 and 3 schematically illustrate not to scale example thermal buffer heat exchangers for implementing enhanced methods for precooling and operational cost reduction in accordance with preferred embodiments.
Figure 3:
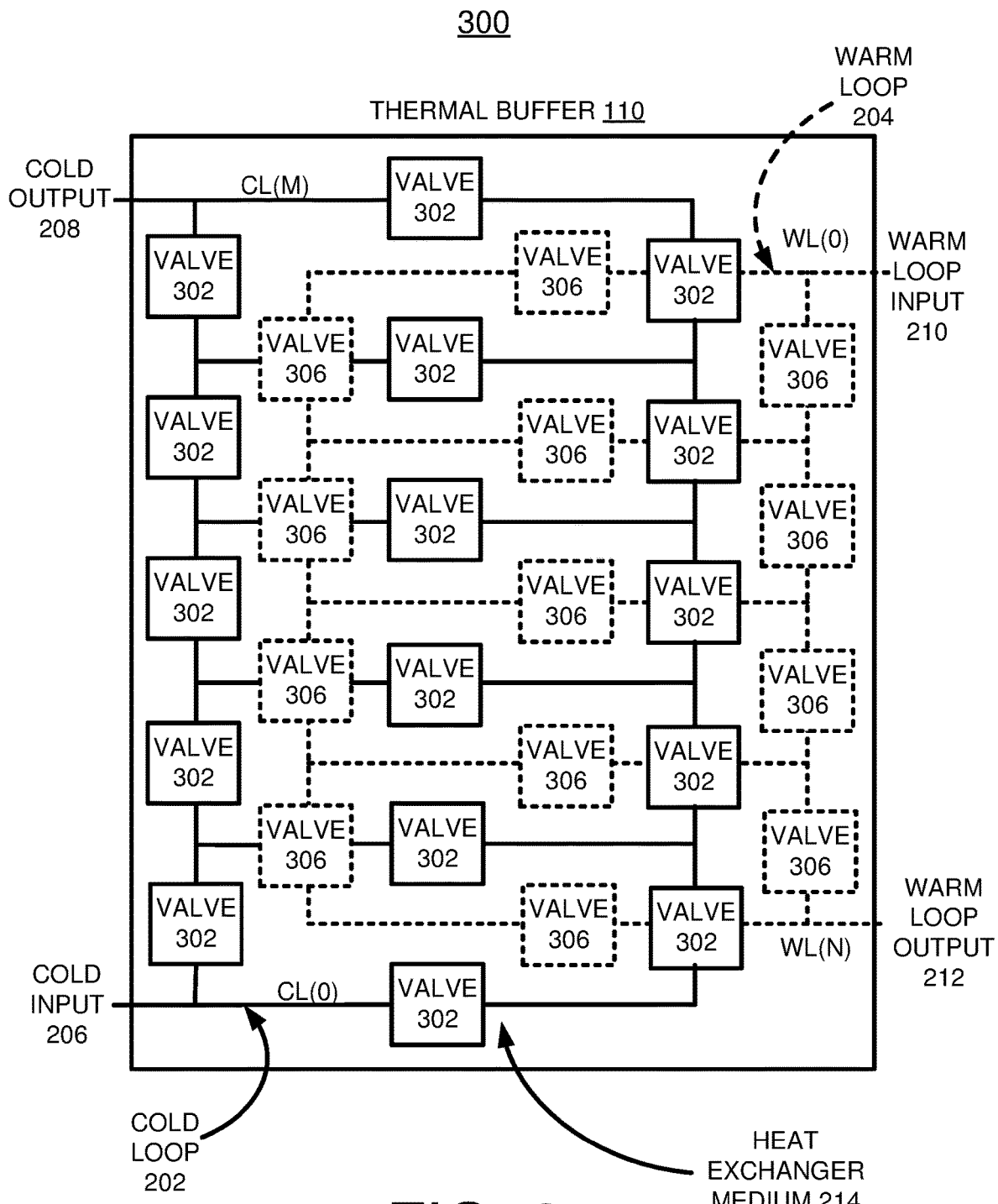
Figure 4:
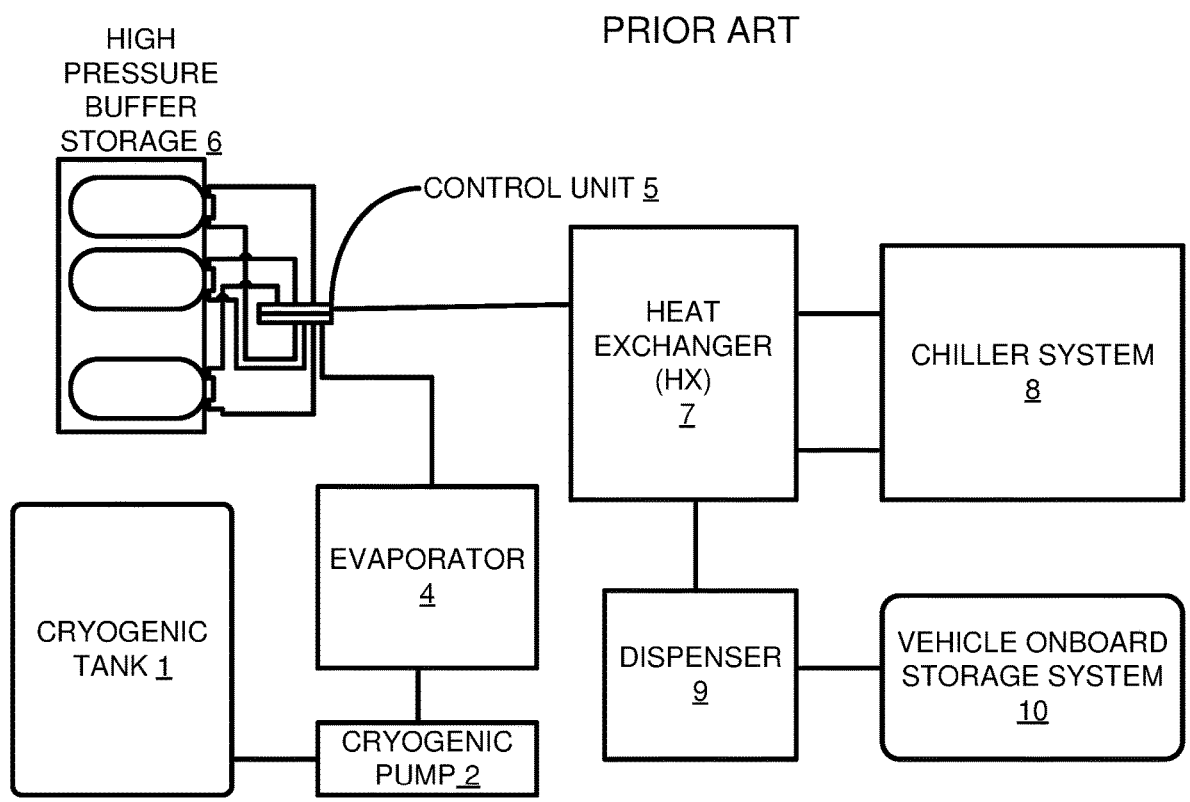
FIG. 4 illustrates a prior art conventional gaseous fueling station with source cryogenic liquid fuel.

Referring also to FIGS. 2 and 3, the thermal buffer heat exchanger 110 includes a cold loop 202 and a warm loop 204 contained in the thermal buffer heat exchanger 110. The cold loop includes the cold input 206 connected to the flow control device 106 and the cold output 208 connected to the one-directional valve 120 shown in FIGS. 1A, 1B, and 1C. The cold loop 202 connects the control unit 112 to the cryogenic pump 104 via the flow control device 106. The cold loop 202 connects the control unit 112 to thermal buffer heat exchanger 110 and to the optional heat exchanger 118.

The warm loop 204 includes the warm input 210 connected to the flow control 126 and the warm output 212 connected to the optional flow mixing device 128 shown in FIGS. 1A, 1B, and 1C.

The thermal buffer heat exchanger 110 includes solid or liquid heat exchanger medium 214 having a high specific heat capacity, which embeds the cold loop 202 and warm loop 204. Liquid cryogenic source fuel from the cryogenic pump 104 is supplied by the flow device 106 to the cold loop 202 to provide the necessary cooling to the heat exchanger medium 214. High-pressure gaseous fuel from the cascade high pressure buffer storage 116 is supplied by the control unit 112 and flow control 126 to the warm loop 204 with heat rejected to the heat exchanger medium 214.

The heat exchanger medium 214 optionally includes a selected solid material having a high specific heat capacity exchange medium, such as aluminum. Also, the heat exchanger medium 214 an include a selected liquid coolant material having a high specific heat capacity. The liquid coolant heat exchanger medium 214 can be stirred if needed by a mixing device (not shown) to ensure substantially uniform temperature distribution throughout the thermal buffer heat exchanger medium 214.

Referring to FIG. 3, the cold loop 202 optionally is circuited CL(0)-CL(M) inside the thermal buffer heat exchanger 110 to allow multiple path lengths and flow rates of LH2 flow with each of a plurality of selectively configured circuits CL(0)-CL(M) of the cold loop 202 using a plurality of coordinated and controlled valves 302 disposed inside thermal buffer heat exchanger 110. The variable selected circuits CL(0)-CL(M) of the cold loop 202 enable the heat exchanger medium temperature of the cold loop to be controlled, for example, with higher cooling demand after a long idle dispenser period, or parallel vehicle fills at multiple dispensing positions.

As illustrated in FIG. 3, the warm loop 204 optionally is circuited WL(0)-WL(N) inside the thermal buffer heat exchanger 110 to allow multiple path lengths and flow rates of gaseous flow with each of a plurality of selectively configured circuits WL(0)-WL(N) of the warm loop 204 so that the exit hydrogen temperature of the warm loop 204 can be controlled using a set of coordinated and controlled valve system including a plurality of coordinated and controlled valves 306, located inside thermal buffer heat exchanger 110.

Referring now to FIG. 1A, typically the thermal buffer heat exchanger 110 is cooled during fueling operations, and during idle dispenser periods between vehicles fueling, during which the high-pressure buffer storage 116 may be replenished. The flow control device 106 controls the temperature of the thermal buffer heat exchanger 110 by controlling the LH2 mass flow rate through cold input 206 and cold loop 202, while the remaining LH2 mass flow from the cryogenic pump 104, if any, is directed through the evaporator 108 to the control unit 112, as indicated by flow arrows shown in FIG. 1A. Control unit 112 decides the hydrogen flow source and direction depending on the mode of fueling operations, the idle dispenser condition, and the temperature of the thermal buffer heat exchanger 110.

Referring to FIG. 1B, flow through inlet control valve 124 to the optional heat exchanger 118 optionally is provided to increase the temperature of the cold loop exit flow or flow temperature from the evaporator 108 illustrated in FIG. 1C. For example, when the dispenser 132 at the hydrogen fueling station 100 remains idle for an extended period, and when the thermal buffer heat exchanger medium 214 cannot be cooled by the flow path illustrated in FIG. 1A, for example, because the high-pressure buffer storage 116 is filled and cannot accept further flow from the cold loop 202, flow from the output valve 122, flow from the optional heat exchanger 118 to the control unit 112 can be mixed with flow supplied from the hydrogen supplied from the high-pressure storage system 116 via control unit 112, before sending the mixed flow to the flow control device 126.

As indicated by solid flow arrows in FIG. 1B, the control unit 112 can control the mixing ratio of the flow from the cold loop output 208 through valve 120 illustrated in solid and dashed flow arrows to control unit 112 and from the high-pressure storage system flow to control unit 112 before sending the mixed flow to flow control 126 as illustrated in solid arrows.

As indicated by dashed flow arrows between the flow control device 126 and the dispenser 132 in FIG. 1B, flow control device 126 controls flow from control unit 112 achieving the preset temperature can be directly supplied to the dispenser 132.

As indicated by dashed flow arrows between the warm loop output 212 of the thermal buffer heat exchanger 110 and the dispenser 132 in FIG. 1B, hydrogen fuel exiting the warm loop 202 achieving the preset temperature can be directly supplied to the dispenser 132.

Flow control device 126 can control mixing of flows from the warm loop output 212 and from flow control 126, as indicated by solid flow arrows shown in FIG. 1B, that are applied to the optional mixing device 128 for mixing to achieve the desired temperature of the mixed hydrogen flow before sending it to the dispenser 132.

Referring also to FIG. 1C, as indicated by solid flow arrows in FIG. 1B, the optional heat exchanger 118 receives gaseous fuel flow from the evaporator 108 through inlet control valve 124 indicated by solid flow arrows. Gaseous fuel flow exits the optional heat exchanger 118 through outlet control valve 122 indicated by solid flow arrows and is received by control unit 112. Gaseous fuel flow output of the optional heat exchanger 118 is supplied to the control unit 112 as indicated in solid flow arrows in both FIGS. 1B, 1C.

As indicated by solid flow arrows in FIGS. 1A, and 1B, the cryogenic liquid fuel flow rate and residence time through the cold loop 202 may be adjusted to control the temperature of the thermal buffer heat exchanger medium 214 by modulating cryogenic pump 104, adjusting the flow control device 106 and/or controlling proper circuit configuration of the cold loop 202 inside thermal buffer heat exchanger 110 using the set of coordinated and controlled valves 302.

In one possible fueling operation, the high-pressure buffer storage system 116 can provide all or part of the gaseous fuel into the vehicle onboard fuel storage tank system 134 through dispenser 132. The optional heat exchanger 118 can be used to increase the exit fuel temperature from the cold loop 202, or out of evaporator 108, before sending it to the high-pressure buffer storage 116 via control unit 112, or before mixing it with hydrogen flowing from the high-pressure buffer 116 and sending it to the flow control device 126. The warm loop 204 within the thermal buffer heat exchanger 110 can cool the high-pressure gaseous fuel flowing from the high-pressure buffer 116 via control unit 112 to the predefined temperature before sending it to the dispenser 132. In fueling operations with part of or all the gaseous fuel from the high-pressure buffer storage 116, gaseous hydrogen from the high-pressure buffer storage system 116 can flow via control unit 112 to the warm loop 204, which cools the hydrogen fuel flow via the thermal buffer heat exchanger 110, before sending the high-pressure gaseous fuel or hydrogen to the vehicle onboard fuel storage tank system 134 through the dispenser 132. The mass flow in the cold loop 202 and the warm loop 204 are coordinated and controlled, for example by using control unit 112 to adjust the respective plurality of coordinated and controlled valves 302 and 306 and/or flow control devices 106, 126 to keep the temperature of the thermal buffer heat exchanger medium 214 within a desired temperature range. In possible fueling operations, hydrogen flowing through valve 120 without going to the optional heat exchanger 118 can be mixed with hydrogen supplied from the high-pressure storage system 116 for fueling the vehicle onboard storage tank system 134, as indicated by dotted and solid flow arrows shown in FIG. 1B. Also as illustrated in FIG. 1A, the hydrogen flowing through evaporator 108, can be mixed with the hydrogen supplied from the high-pressure storage system 116 via control unit 112, before sending the mixed flow to flow control dev\ice 126.

In one possible parallel or alternative fueling operation path, a direct fueling operation is enabled without going through high-pressure buffer storage 116. With vehicle fueling using the hydrogen output from the cold loop 202, optionally is sent through the heat exchanger 118, and/or direct to control unit 112, and coupled to the flow control 126 via control unit 112 to the warm loop 204 inside the thermal buffer heat exchanger 110 for further temperature control before sending the high-pressure gaseous fuel to the dispenser 132 for direct fueling of the gaseous vehicle onboard storage tank system 134. In another direct fill operation, the hydrogen out of the cold loop 202 may be sent directly to the dispenser 134 via flow control device 126 when the hydrogen is already at the desired hydrogen dispensing temperature. The hydrogen flow from flow control device 126 may be mixed with hydrogen from warm path 204 flowing through thermal buffer heat exchanger 110 using optional mixing device 128 before being sent to dispenser 132 for fueling vehicle onboard storage tank system 134.

The high-pressure buffer fueling operation and the direct fueling operation as described above can occur simultaneously, in parallel, jointly feeding the same dispenser 132, or may operate in sequence, or individually exclusive of one another, depending on the desired fueling operation for a given fueling demand configuration and associated equipment and operation cost.

While the present invention has been described with reference to the details of the embodiments of the invention shown in the drawing, these details are not intended to limit the scope of the invention as claimed in the appended claims.

What is claimed is:

1. A precooling system used with a gaseous fueling station precooling high pressure gaseous fuel to a required preset temperature before dispensing into a vehicle onboard storage tank system, said precooling system comprising:
    a cryogenic tank containing a cryogenic liquid fuel,
    a thermal buffer heat exchanger including a heat exchanger medium, said thermal buffer heat exchanger further comprising a cold loop and a warm loop contained in said heat exchanger medium,
    said thermal buffer heat exchanger further comprising a first plurality of selectively configured circuits comprising a first set of coordinated and controlled valves disposed inside said warm loop, said first plurality of selectively configured circuits are further configured to precool high-pressure gaseous fuel to the vehicle onboard storage tank system in response to operational modes of the thermal buffer heat exchanger;
    said thermal buffer heat exchanger further comprising a second plurality of selectively configured circuits comprising a second set of coordinated and controlled valves disposed inside said cold loop, said second plurality of selectively configured circuits further configured to control the temperature of said heat exchanger medium;
    said first and second plurality of selectively configured circuits each further comprising a plurality of paths, path lengths, and flow rates;
    said thermal buffer heat exchanger further configured to precool precooling high pressure gaseous fuel to a preset temperature supplied to the vehicle onboard storage tank system utilizing the cooling capacity of the cryogenic liquid fuel;
    said warm loop and said cold loop of said thermal buffer heat exchanger further configured to enable multiple selected path lengths and flow rates;
    said warm loop further configured to adjust a residence time through said warm loop to match exit gaseous fuel temperature to the required preset dispensing temperature with heat rejected into the heat exchanger medium;
    said cold loop further configured to adjust a residence time through said cold loop and control temperature of said thermal buffer heat exchanger medium in response to a cooling demand resulting from a predetermined idle dispenser period and from vehicle fills;
    a control unit coupled to and controlling said thermal buffer heat exchanger and said first and second pluralities of selectively configured circuits, a first flow control device and a second flow control device,
    wherein said first flow control device is coupled to said control unit and an input of said warm loop of said thermal buffer heat exchanger, and
    wherein said second flow control device is coupled to said control unit and an input of said cold loop of said thermal buffer heat exchanger;
    wherein said control unit is configured to control flow from said cold loop and said warm loop;
    wherein said control unit is further configured to control the gaseous fuel flow path to the vehicle onboard storage tank system responsive to operational modes of said thermal buffer heat exchanger;
    wherein said control unit is further configured to selectively control said first flow control device and pressurized gaseous fuel supplied to said input of said warm loop of said thermal buffer heat exchanger, responsive to operational modes of said thermal buffer heat exchanger;
    wherein said control unit is further configured to selectively control flow of pressurized gaseous fuel to the vehicle onboard storage tank system responsive to operational modes of said thermal buffer heat exchanger; and
    wherein said control unit is further configured to selectively control said second flow control device and cryogenic liquid fuel flow to said input of said cold loop of said thermal buffer heat exchanger, responsive to said operational modes of said thermal buffer heat exchanger and cooling demand.

2. The system as recited in claim 1, wherein said second flow control device and said second plurality of selectively configured circuits coupled to said control unit are configured to enable the controlling of flow in response to operational modes of the thermal buffer heat exchanger.

3. The system as recited in claim 1, further comprising a modulating drive control configured to control the mass flow rate of cryogenic liquid fuel into the thermal buffer heat exchanger.

4. The system as recited in claim 1 wherein said heat exchanger medium further comprises a selected solid material having a high specific heat capacity.

5. The system as recited in claim 1 wherein said heat exchanger medium further comprises a selected liquid coolant material having a high specific heat capacity, and said liquid coolant material is configured to ensure substantially uniform temperature distribution throughout the thermal buffer heat exchanger.

6. The system as recited in claim 1, wherein said control unit is further configured to enable providing gaseous fuel to the vehicle onboard storage tank system from said cryogenic tank, bypassing said thermal buffer heat exchanger.

7. The system as recited in claim 1 includes a source fuel in cryogenic state includes a selected one of liquid hydrogen (LH2) and Liquefied Natural Gas (LNG).

8. The system as recited in claim 1, wherein said control unit is further configured to selectively enable, simultaneously, in parallel, and in sequence providing gaseous fuel to the vehicle onboard storage tank system via a dispenser from said thermal buffer heat exchanger and from said cryogenic tank, bypassing said thermal buffer heat exchanger.

9. The system as recited in claim 1, wherein said control unit is further configured to enable, individually and independently, providing gaseous fuel to the vehicle onboard storage tank system from said thermal buffer heat exchanger and from said cryogenic tank, bypassing said thermal buffer heat exchanger.

10. A method for precooling high pressure gaseous fuel, said method comprising the steps of:

provseaing a precooling system comprising a cryogenic tank containing a cryogenic liquid fuel, a thermal buffer heat exchanger including a heat exchanger medium, a cold loop and a warm loop contained in said heat exchanger medium, and a vehicle onboard storage tank system;

providing high pressure gaseous fuel to a vehicle onboard storage tank system;

providing a first plurality of selectively configured circuits comprising a first set of coordinated and controlled valves disposed inside said warm loop, said first plurality of selectively configured circuits further configured to, responsive to operational modes of the thermal buffer heat exchanger, precool the high-pressure gaseous fuel to the vehicle onboard storage tank system;

providing a second plurality of selectively configured circuits comprising a second set of coordinated and controlled valves disposed inside said cold loop, said second plurality of selectively configured circuits configured to control the temperature of said heat exchanger medium;

said first and second plurality of selectively configured circuits each further comprising a plurality of paths, path lengths, and flow rates;

using said thermal buffer heat exchanger to precool the high pressure gaseous fuel supplied to the vehicle onboard storage tank system to a preset temperature by utilizing the cooling capacity of cryogenic liquid fuel;

selectively circuiting said warm loop and said cold loop of said thermal buffer heat exchanger via said first plurality of selectively configured circuits and second plurality of selectively configured circuits, enabling multiple selected path lengths and flow rates;

selectively circuiting said warm loop via said first plurality of selectively configured circuits, and matching an exit gaseous fuel temperature to a predefined dispensing temperature;

selectively circuiting said cold loop via the second plurality of selectively configured circuits, controlling the temperature of said heat exchanger medium responsive to cooling demand resulting from a predetermined idle dispenser period and from simultaneous vehicle fills at multiple dispensing positions;

selectively coupling cryogenic liquid fuel mass flow into said thermal buffer heat exchanger and into a high-pressure buffer storage, enabling enhanced fueling operation;

providing a control unit coupled to and controlling said thermal buffer heat exchanger, said cold loop and said warm loop within said thermal buffer heat exchanger;

providing a first flow control device and a second flow control device, coupling said first flow control device to said control unit and an input of said warm loop of said thermal buffer heat exchanger and coupling said second flow control device to said control unit and an input of said cold loop of said thermal buffer heat exchanger;

controlling flow from said cold loop and said warm loop by utilizing said control unit;

selectively controlling a gaseous fuel flow path to the vehicle onboard storage tank system responsive to operational modes of said thermal buffer heat exchanger; and selectively controlling said second flow control device and cryogenic liquid fuel supplied to said input of said cold loops and selectively controlling said first flow control device and pressurized gaseous fuel supplied to said input of said warm loop of said thermal buffer heat exchanger responsive to cooling demand and operational modes of said thermal buffer heat exchanger.

11. The method as recited in claim 10, wherein said control unit controls cryogenic liquid fuel mass flow rate to said thermal buffer heat exchanger.

12. The method as recited in claim 10, wherein said control unit selectively opens and closes said first and second sets of coordinated and controlled valves to enable the multiple path lengths and flow rates in said cold loop and said warm loop of said thermal buffer heat exchanger.

13. The method as recited in claim 10, further comprising selectively enabling a providing gaseous fuel to the vehicle onboard storage tank system from said cryogenic tank, bypassing said thermal buffer heat exchanger.

* * * * *